Patented Mar. 31, 1931

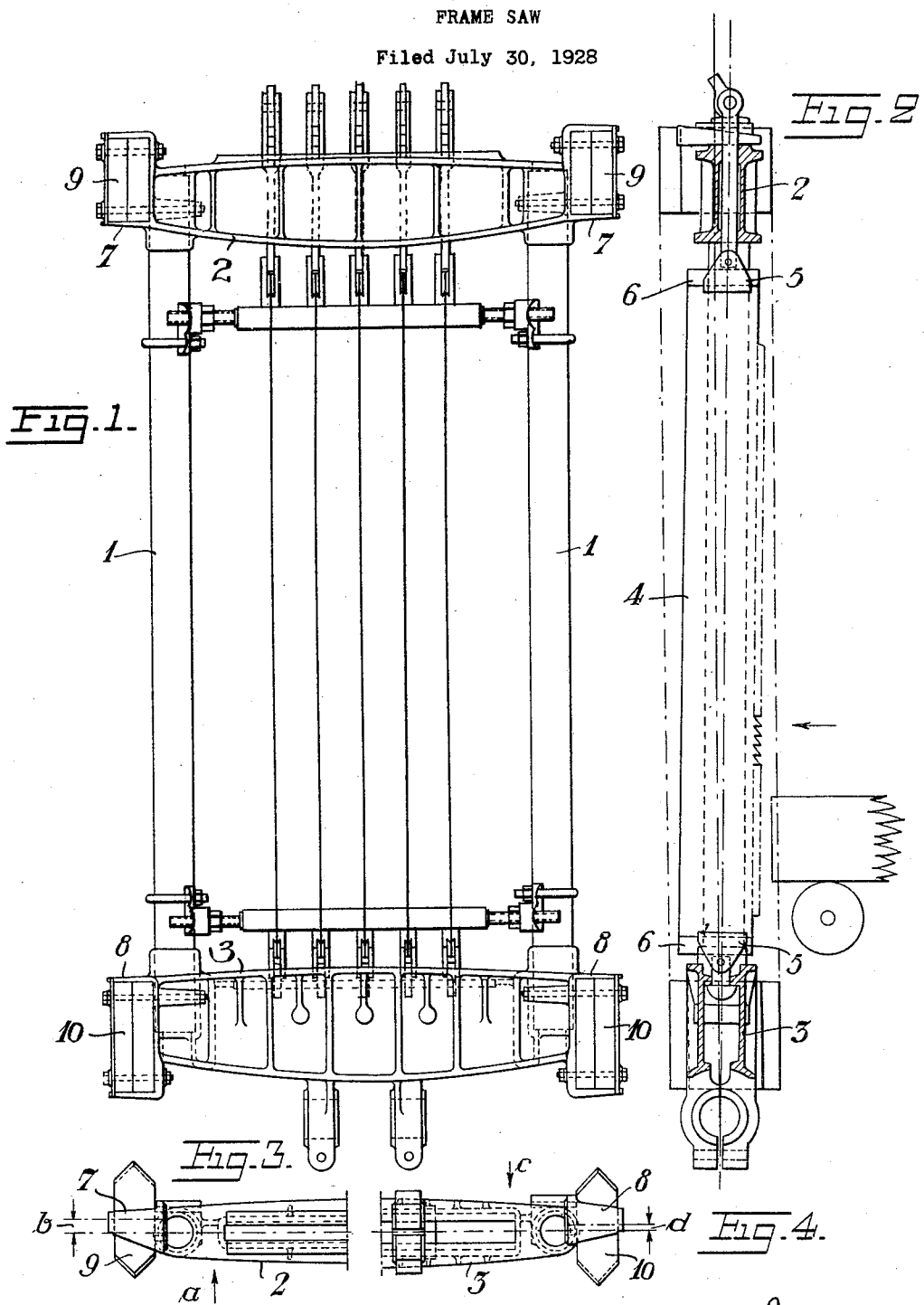

1,799,108

UNITED STATES PATENT OFFICE

EMIL LÖF, OF STOCKHOLM, SWEDEN

FRAME SAW

Application filed July 30, 1928, Serial No. 296,343, and in Sweden June 27, 1928.

This invention relates to frame saws and more particularly to vertical log frames. In such frames it is necessary when using saw blades for cutting in one direction to so fix the blades in the frame as to cause them to overhang so that in the upstroke of the saw the teeth line of the blades may retire in the direction away from the feed side of the saw at a rate corresponding to the rate of feed of the log.

A well known method of obtaining such overhanging is to fix the blades in an inclined position between the saw buckles. In such case, however, the top buckle will engage the respective cross strips of the saw blade at a greater distance from the teeth line than the bottom buckle. As a result, the tension of the saw blades will not be parallel to the teeth line thereby rendering the tensioning of the latter not uniform and the kerf uneven.

The present invention has for its object to overcome said difficulties.

The invention is characterized, chiefly, by the fact that the sliding guide blocks are adjusted laterally with respect to the center lines of the cross beams so that, when the frame is in its place in the standard, the upper beam will overhang relatively to the lower beam to a degree corresponding to the overhang of the saw blades.

The top and bottom buckles will, consequently, engage the respective cross strips of the saw blades at equal distances from the teeth line, thereby rendering the tension of the blade parallel to the teeth line with resulting uniform tensioning of the teeth line and an even kerf.

In the accompanying drawing one embodiment of the invention is illustrated.

Fig. 1 is a front elevation of a saw frame in accordance with this invention. Fig. 2 is a vertical cross section of the frame with blades fixed therein. Fig. 3 is a top plan view of part of the upper cross beam and, Fig. 4 is a view of part of the lower cross beam as seen from the under side.

The frame shown comprises in well known way a pair of side bars 1, 1, an upper cross beam 2 and a lower cross beam 3 between which the saw blades are fixed. In Fig. 2 one saw blade 4 is shown fixed by means of the buckles 5, 5 engaging cross strips 6, 6 of the saw blade and which may be operated for tensioning the saw blades, as by means of eccentrics and wedges in connection with the top buckles, as shown in Fig. 2.

Each cross beam 2, 3 is formed at its ends with means, as bows 7, 8, to hold sliding guide blocks 9 and 10, respectively, adapted to engage fixed guide-ways of the frame standard.

The upper sliding guide blocks 9 are adjusted laterally in the holders 7 with respect to the center line of the upper cross beam 2 as shown in Fig. 3 where the arrow $a$ indicates the direction of feed and $b$ indicates the distance between the center lines of the cross beam 2 and the sliding guide blocks 9. As regards the lower cross beam, the sliding guide blocks 10 are adjusted laterally in the holders 8 with respect to the center line of the lower cross beam 3 as indicated by the arrow $c$ in Fig. 4, to an extent which is indicated by the distance $d$ between the centre lines of the cross beam 3 and the sliding guide blocks 10. Said displacements are so chosen that the upper cross beam will be displaced towards the feed side relatively to the lower cross beam to such an extent as corresponds to the overhanging of the saw blades desired. The overhanging desired may, thus, be obtained by merely fixing the blades so that the top and bottom buckles 5 engage the cross strips 6 at equal distances from the teeth line, as shown in Fig. 2. The tension of the blades will thus be parallel to the teeth line and may be positioned in as close proximity thereto as may be desired. As a result, the operating part of the blades will be under uniform tension throughout all of its length thereby preventing an uneven kerf to the largest degree possible.

What I claim is:

In a saw frame comprising bars and upper and lower cross beams between which the saw blades are fixed; fixed holders in the ends of said cross beams; sliding guide blocks in said holders designed to engage guide ways in a frame standard; said sliding guide blocks being adjustable laterally in the cross beam holders relatively to the center lines of the cross beams to secure the relative displacement of the upper and lower cross beams with respect to the plane of the frame standard to a degree which corresponds to the necessary overhang of the saw blades.

In testimony whereof I have signed my name.

EMIL LÖF.